April 21, 1931.  W. NOBLE  1,801,683
HYDRAULIC VALVE GEAR
Filed April 3, 1928
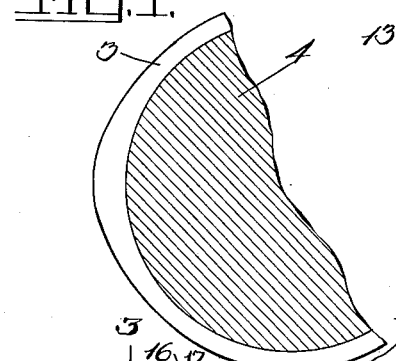
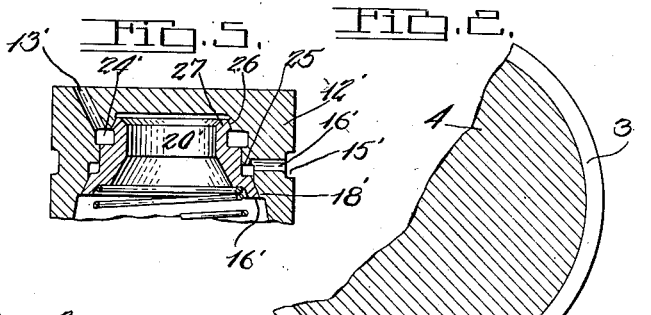
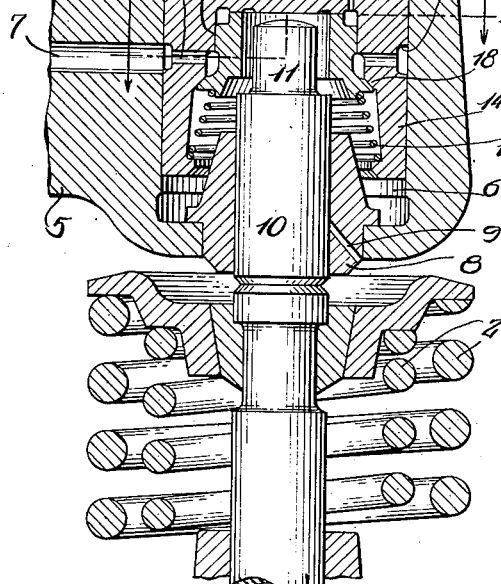
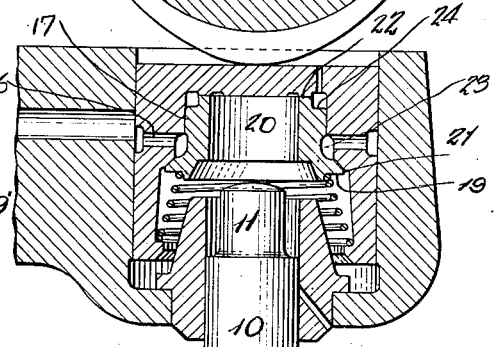
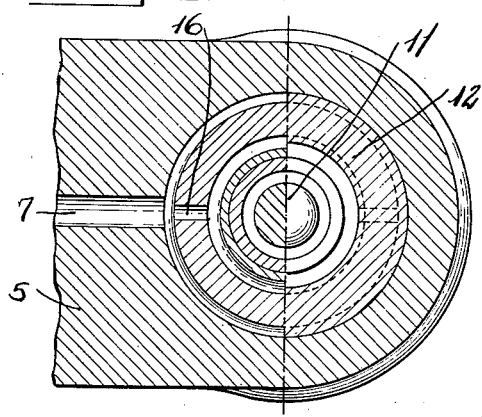
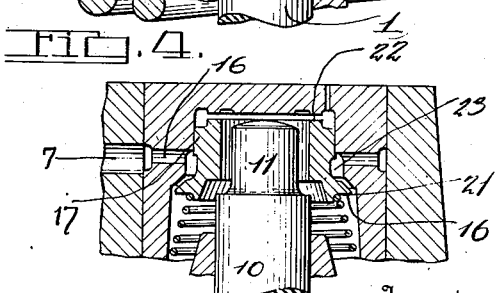
Inventor
Warren Noble
By Stanley Lightfoot
Attorney Patented Apr. 21, 1931

1,801,683

UNITED STATES PATENT OFFICE

WARREN NOBLE, OF DETROIT, MICHIGAN

HYDRAULIC VALVE GEAR

Application filed April 3, 1928. Serial No. 267,117.

This invention relates to a hydraulic valve actuating means and has for its object to provide a simple and compact arrangement which readily adapts itself to incorporation in valve-in-head or L-head engines without extensive structural change from that which is common in many types of engines having mechanically operated valves.

The invention contemplates the utilizing of upper and lower relatively movable members, one of which is operated by a cam and the other of which operates a puppet valve, said members having an interposed body of hydraulic fluid adapted to impart motion from one to the other upon the operation of the cam, and the other of which members carries a bleed valve operating to control ingress and egress of fluid to and from the space between said members for the scavenging of air from the said interposed body.

A further object is to provide a valve gear wherein the operating parts do not necessarily call for maintenance of true axial alignment and wherein such alignment may be varied within limits to meet varying relations of operating structure to valve structure.

Further objects and advantages subsidiary to or resulting from aforesaid objects or from the construction or operation of the arrangement as it may be carried into effect will become apparent as the said invention is hereinafter further disclosed.

In carrying the said invention into effect I may adopt the novel construction and arrangement of parts hereinafter described by way of example, having reference to the accompanying drawing wherein:

Figure 1 shows a vertical sectional view of the device with all parts in seated position.

Figure 2 shows a similar view to that in Figure 1 showing position of parts during maximum actuation of the puppet valve.

Figure 3 is a sectional view taken along line 3—3 of Figure 1.

Figure 4 is a partial view of Figure 1 showing the bleed valve in actuated position.

Figure 5 shows a modification of the bleed valve and its seats.

Referring more particularly to the drawings:

Numeral 1 refers to the valve stem of a puppet valve of an internal combustion engine supported by the usual springs 2. 3 indicates a low lift cam mounted on a camshaft 4 shown here as of the overhead type. Between the valve stem and cam I interpose a casing 5 bored cylindrically at 6 and coaxially with the valve stem and having a fluid supply passage 7 leading from a source of fluid pressure (not shown) into said bored out portion 6. The upper end of cylinder 6 is open while the lower end is closed by a cylinder 8 rigidly fixed thereto. Cylinder 8 has a downwardly extending passageway 9 whose purpose will be explained later.

Slidably fitted in cylinder 8 is a plunger 10, the lower end of which contacts the valve stem 1, while the upper end is reduced at 11 and extends substantially above the upper end of cylinder 8 in the position Figure 1.

Slidably mounted in the other end of cylinder 6 is a plunger 12 which overlies plunger 10. Plunger 12 is closed at one end as shown except for a small vent 13 and has walls 14 extending substantially the length of cylinder 6. An annular groove 15 is formed in walls 14 in such a way as to be in communication with passageway 7 at all positions of the cam 3. Leading inwardly from groove 15 are two or more passages 16 which establish constant communication between the source of fluid supply and the interior of plunger 12. Above passages 16 a shoulder 17 is formed which extends to the base of plunger 12 and is bored smooth to form a bearing as will appear more fully. Below passages 16 a further shoulder 18 is formed and beveled as shown. At the outer end of cylinder 12 a flange or shoulder 19 is formed which acts as a seat for a spiral spring 19'. It is desirable to have walls 14 extend substantially the length of cylinder 6 in order to distribute the sideward component of the cam thrust over as large an area as possible. Permitting cylinder 8 to be slightly enveloped by plunger 12 also gives a very compact arrangement of parts besides other advantages which will presently appear.

Spring 19' abuts a member 20 which acts as a bleed valve controlling both ingress and egress of fluid and separates the interior of plunger 12 into two compartments. Valve 20 is cylindrically bored with a slightly larger bore than puppet valve head 11 and has at one end a beveled flange 21 whereby the valve may seat against beveled shoulder 18, while the opposite end 22 is machined accurately to simultaneously and effectively seat against the base of plunger 12. The space thus blocked off forms the hydraulic chamber. An annular groove 23 is formed adjacent the beveled seat 18 in such a way that the main component of fluid pressure thru passages 16 is substantially vertical against the action of spring 19'. The annular groove 23 together with the adjacent walls of plunger 12 forms a fluid reservoir. Around the top of valve 20 is formed another groove 24 which acts as a spillway for fluid from the fluid chamber at times when valve 20 is displaced from its two seats and which may utilize vent 13 as an outlet therefor. This spillway is adjacent the highest point in the system, which is the region of air accumulation, hence upon opening of valve 20 air and oil will be forced out into spillway 24. By forming valve 20 interiorly as explained, plunger 10 may project upwardly to a point very close to the base of plunger 12. The advantage of this is that if fluid in the chamber be lost such as occurs in a dry engine contact of plungers 10 and 12 under the actuation of plunger 12 by cam 3 insures sufficient opening of puppet valve 1 to start the engine. As soon as the oil pump or other pressure device is put in actuation the chamber will then become promptly filled with fluid.

The modification shown in Figure 5 involves merely a structural change. Plunger 12' has a vent 13' thru its base and an annular groove 15' formed in its walls which communicates with the interior of said plunger by way of passages 16'. An annular shoulder 25 is formed immediately above passages 16' and an annular beveled shoulder 18' is formed below said passages. A second annular beveled shoulder 26 is formed in the base of plunger 12', the plane of the two bevels being preferably coincident for purposes of simplifying the machine work. The two beveled shoulders act as seats for a control valve 20' which has shoulders 16' and 27 formed thereon. The space below shoulder 25 serves as a reservoir, as explained previously, while the annular groove 24', together with the adjacent walls of plunger 12' form a spillway adapted to be vented at 13'. The operation is the same as that of the other figures and will be clearly understood from the following:

Assume we start with Figure 1 and that cam 3 revolves to a position as shown in Figure 2. Plunger 12 will be depressed displacing a certain amount of fluids, which will displace plunger 10 a distance proportional to the amount of fluid displaced. If the area of plunger 12 be four times as great as the head and shoulder area of plunger 10 then plunger 10 will be displaced four times as far as plunger 12, hence a cam of one-fourth the usual lift may be employed. After plunger 12 has returned to its position as shown in Figure 1, if air is present or if any leakage has occurred which creates a drop in pressure in the chamber below that in the reservoir 23 and hence in line 7, control valve 20 will be displaced by the differential pressure and the position of parts will be as shown in Figure 4. Valve 20 will leave its two seats, fluid will flow downwardly into the chamber past seat 18 and air and emulsified oil will be forced out the top into spillway 24, and out thru vent 13 where it will lubricate the bearing surface of plunger 12 at the points of contact by cam 3.

In case valve 1 sticks in an open position plunger 10 would be driven downwardly to a point such that the shoulder of the plunger would uncover passage 9, at which point pressure would be relieved. This acts to prevent driving the valve far enough into the engine cylinder to be struck by the piston.

It should be understood that the particular form of annular passageways 15 and 24, for example, does not need to be structurally adhered to, as these are obviously expedients for providing freedom of flow between ingress and degress passages, and in the case of the annular passageway 24, this is more particularly provided for the purpose of giving a form to the seat 22 of the member 20, which will effectively close when required.

It will be further apparent that although the arrangement discloses the puppet valve as being beneath the hydraulic actuator, it might quite easily be placed there above with the cam beneath the actuator. For instance, with the cam placed there beneath the plunger 10 may be actuated by the cam and the valve stem contacted with the upper end of the plunger 12, the proportions of the plunger 12, and the plunger 10, being varied to such extent as would be required to give the proportionate movement of the plunger 12 relative to that of the plunger 10 required under these conditions of operation. Thus the device is capable of ready adaptation to a valve which extends either upwardly or downwardly therefore, and is consequently applicable to valve-in-head or L-head engines with equal facility.

I claim:

1. In a hydraulic valve operating mechanism, a plunger, a second plunger overlying said first named plunger, a fluid chamber between said plungers and an air relief valve in said second plunger adapted to release air from said chamber during periods of valve inactivity and to close during periods of puppet valve actuation.

2. In a hydraulic valve operating mechanism, a fixed cylinder having a plunger therein, a second fixed cylinder coaxial with the first named cylinder, of a different radius therefrom and having a plunger therein, one of said cylinders partially projecting into the other of said cylinders and a fluid chamber between the pistons in said cylinders, each of said plungers being independently supported by its own cylinder whereby movement of said larger piston produces larger movement of the smaller piston.

3. In a hydraulic valve operating mechanism, a fixed cylinder, a second fixed cylinder of smaller diameter coaxial with the first cylinder and partially projecting therein, and a cup-shaped piston in said first cylinder, the walls of said piston extending below the inner end of said smaller cylinder, a piston in said smaller cylinder and a fluid chamber between said pistons, each of said plungers being independently supported by its own cylinder whereby movement of said larger piston produces larger movement of the smaller piston.

4. In a hydraulic valve operating mechanism, a cylinder having a plunger therein, a second cylinder of larger diameter than said first cylinder concentric in part therewith and having a plunger therein, said last named plunger having an inlet port therein, and a fluid chamber between said plungers supplied thru said inlet port, said plungers being adapted to contact in the absence of fluid.

5. In a hydraulic valve operating mechanism, a cylinder having a plunger therein adapted to actuate a puppet valve, a second cylinder of larger diameter than said first cylinder partially concentric therewith and having a plunger therein adapted to be actuated by a cam, a fluid chamber between said plunger and an air relief valve for the fluid in said chamber carried by one of said plungers, said plungers contacting for valve actuation in the absence of fluid in said chamber.

6. In a hydraulic valve operating mechanism, a cylinder having a plunger therein, a second cylinder of larger diameter than said first cylinder and a body of fluid between said plungers, said last named plunger having inlet and outlet ports therein for said body of fluid, a ring shaped control valve for said ports interiorly of said last named plunger having an internal diameter less than that of the top of said first named plunger whereby contact of said plungers in the absence of said body of fluid leaves said valve free to function normally.

7. In a hydraulic valve operating mechanism, a cylinder having a piston therein, a second cylinder of larger diameter than and partially enveloping said first cylinder, and having a piston therein, a fluid chamber between said pistons and a valve to control inlet and egress of fluid in said chamber, said valve being carried by one of said plungers.

8. In a hydraulic valve operating mechanism, a plunger, a second plunger coaxial with said first plunger, a fluid chamber between said plungers, an air relief valve in one of said plungers, and spring means normally maintaining said valve in closed position.

9. In a hydraulic valve operating mechanism, a plunger, a second plunger and a fluid chamber between said plungers, an air relief valve within said second plunger and an air vent adapted to release air from said plunger upon actuation of said relief valve.

10. In a hydraulic valve mechanism, a plunger, a second plunger, fluid means between said plungers, a relief valve and a discharge chamber in said second plunger, said discharge chamber adapted to receive fluid and air upon actuation of said valve, and a vent for said discharge chamber.

11. In a hydraulic valve mechanism, a plunger in operative position with a valve stem, a second plunger in operative position with a cam having an inlet port and a vent therein, a fluid chamber between said plungers supplied thru said inlet port, a cylindrical member having a sliding fit with the inner portion of said second plunger overlying said inlet port and adapted to abut against a shoulder therein, said cylinder member being adapted to recede by fluid pressure in said inlet port against said flanged portion in excess of the pressure in said fluid chamber whereby air is allowed to pass thru said vent.

12. In a hydraulic valve operating mechanism, a casing having a fluid passage therein, a plunger in said casing, a second plunger projecting into said casing, a third member in said casing between said plungers, said third member being adapted to check return flow of fluid in said chamber upon actuation of said first mentioned plunger and unseating to afford relief of air in said chamber during the period of fluid replenishment to said chamber.

13. In a hydraulic valve mechanism, a main inlet passage, a plunger, a second plunger having a cup-shape and adapted to fit over and above said first plunger and having two annular shoulders in the sides thereof and an inlet passage adapted to communicate with said main inlet passage on the one side and having its outlet between said two annular shoulders, on the other side a cylindrical member positioned in said second plunger having a flange adapted to seat on the outer of said two shoulders and also to abut against the base thereof and to having sliding engagement with that portion of said plunger between the base and the inner shoulder thereof, thereby forming an annular fluid chamber, and a spring adapted to retain said cylindrical member normally seated.

14. In a hydraulic valve mechanism for use with an overhead cam shaft, a lower plunger for operating a valve, an upper plunger for operation by a cam, a fluid chamber between said plungers, an air and oil relief valve in said upper plunger adapted to release fluid from said mechanism onto the bearing surface of said cam and plunger to effect lubrication thereof.

15. In a hydraulic valve gear, two plungers, a fluid chamber between said plungers, a fluid pressure line to said chamber, a spillway in one of said plungers in constant communication with a vent and means for periodically connecting said chamber with said spillway to affect a bleeding of the fluid therein.

16. The combination as set forth in claim 15, said spillway being adjacent to the region of air accumulation.

17. In a hydraulic valve operating mechanism, a cylinder having a plunger therein, a second cylinder coaxial with said first cylinder and having a plunger therein, a fluid chamber between said plungers, a pressure relief valve in one of said cylinders operative under excess pressure in said chamber to vent the fluid in said chamber whereby undue travel of the driven plunger, and an air relief valve carried by the other of said cylinders.

In testimony whereof I affix my signature.

WARREN NOBLE.